US010942825B2

(12) United States Patent
Danilov et al.

(10) Patent No.: US 10,942,825 B2
(45) Date of Patent: Mar. 9, 2021

(54) MITIGATING REAL NODE FAILURE IN A MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 119 days.

(21) Appl. No.: 16/261,548

(22) Filed: Jan. 29, 2019

(65) Prior Publication Data

US 2020/0241983 A1    Jul. 30, 2020

(51) Int. Cl.
*G06F 11/20* (2006.01)
(52) U.S. Cl.
CPC ...... *G06F 11/2069* (2013.01); *G06F 2201/82* (2013.01)
(58) Field of Classification Search
CPC . G06F 11/079; G06F 11/2069; G06F 11/2094
See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 5,950,225 A | 9/1999 | Kleiman | |
| 6,502,243 B1 | 12/2002 | Thomas | |
| 7,389,393 B1 | 6/2008 | Karr et al. | |
| 7,577,091 B2 | 8/2009 | Antal et al. | |
| 7,631,051 B1 | 12/2009 | Fein et al. | |
| 7,664,839 B1 | 2/2010 | Karr et al. | |
| 7,680,875 B1 | 3/2010 | Shopiro et al. | |
| 7,721,044 B1 | 5/2010 | Chatterjee et al. | |
| 8,125,406 B1 | 2/2012 | Jensen et al. | |

(Continued)

OTHER PUBLICATIONS

Non-Final Office Action received for U.S. Appl. No. 16/209,185 dated Jun. 18, 2020, 22 pages.

(Continued)

*Primary Examiner* — Kamini B Patel
*Assistant Examiner* — Kurosu Risa Altaf
(74) *Attorney, Agent, or Firm* — Amin, Turocy & Watson, LLP

(57) ABSTRACT

Mitigating the effects of a real node failure in a mapped redundant array of independent nodes, e.g., mapped cluster is disclosed. In response to a change in an accessibility to data stored on a real storage device of a real node of a real cluster, wherein the real storage device corresponds to a mapped storage device of a mapped node of a mapped cluster, substituting a reserved real storage device for the real storage device. The substituting the reserved real storage device can correspond to a change in a topology of the mapped cluster, wherein the change in the topology comprises replacing the mapped storage device with a substitute mapped storage device that corresponds to the replacement real storage device. The changed topology can enable writing of data to the substitute mapped storage device that can cause writing of corresponding data to the reserved real storage device.

20 Claims, 10 Drawing Sheets

(56) References Cited

U.S. PATENT DOCUMENTS

| | | |
|---|---|---|
| 8,261,033 B1 | 9/2012 | Slik et al. |
| 8,370,542 B2 | 2/2013 | Lu et al. |
| 8,479,037 B1* | 7/2013 | Chatterjee .......... G06F 11/2094 |
| | | 714/4.11 |
| 8,495,465 B1 | 7/2013 | Anholt et al. |
| 8,751,599 B2 | 6/2014 | Tran et al. |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1 | 10/2014 | Cypher |
| 8,972,478 B1 | 3/2015 | Storer et al. |
| 9,003,086 B1 | 4/2015 | Schuller et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Sarfare et al. |
| 9,405,483 B1 | 8/2016 | Wei et al. |
| 9,477,682 B1 | 10/2016 | Bent et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,055,145 B1 | 8/2018 | Danilov et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,496,330 B1 | 12/2019 | Bernat et al. |
| 10,503,611 B1 | 12/2019 | Srivastav et al. |
| 10,579,490 B2 | 3/2020 | Danilov et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2005/0080982 A1* | 4/2005 | Vasilevsky .............. G06F 9/50 |
| | | 711/1 |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1* | 4/2007 | Takahashi .......... G06F 11/0727 |
| | | 360/99.12 |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0145208 A1* | 6/2013 | Yen .................. G06F 11/2094 |
| | | 714/6.22 |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1* | 9/2015 | Krishnamurthy ....... G06F 3/0689 |
| | | 714/6.24 |
| 2015/0303949 A1 | 10/2015 | Jafarkhani et al. |
| 2015/0331766 A1 | 11/2015 | Saifare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |

(56) References Cited

U.S. PATENT DOCUMENTS

| | | |
|---|---|---|
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1* | 3/2018 | Burden ............... G06F 11/079 |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1* | 2/2019 | Juniwal ............... G06F 3/0649 |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1* | 7/2019 | Lingarajappa ........ G06F 3/0689 |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0050510 A1* | 2/2020 | Chien ............... G06F 11/008 |
| 2020/0104377 A1 | 4/2020 | Earnesty, Jr. et al. |
| 2020/0117556 A1* | 4/2020 | Zou ............... G06F 3/0659 |

OTHER PUBLICATIONS

Martin Hosken, Developing a Hyper-Converged Storage Strategy for VMware vCloud Director with VMware vSAN, Jan. 2018 (Year 2018).

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Natarajan, RAID 0, RAID 1, RAID 5, RAID 10 Explained with Diagrams, Aug. 10, 2010, thegeekstuff.com (18 pages).

Non-Final Office Action received for U.S. Appl. No. 16/177,285 dated Jul. 22, 2020, 31 pages.

Non-Final Office Action received for U.S. Appl. No. 16/261,547 dated Sep. 3, 2020, 26 pages.

Office Action received for U.S. Appl. No. 16/254,073, dated Aug. 18, 2020, 62 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Non-Final Office Action received for U.S. Appl. No. 15/651,504 dated Mar. 21, 2019, 10 pages.

Non-Final Office Action received for U.S. Appl. No. 15/662,273 dated Nov. 16, 2018, 19 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Wikipedia, "Standard Raid Levels—RAID 6", URL: https://en.wikipedia.org/wiki/Standard_RAID_levels#RAID_6 , Oct. 18, 2019, 11 pages.

Non-Final Office Action received for U.S. Appl. No. 15/656,382 dated Nov. 1, 2019, 47 pages.

Final Office Action received for U.S. Appl. No. 15/952,179 dated Nov. 26, 2019, 53 pages.

Non Final Office Action received for U.S. Appl. No. 16/024,314 dated Nov. 25, 2019, 42 pages.

Non-Final Office Action received for U.S. Appl. No. 16/177, 278 dated Dec. 2, 2019, 55 pages.

Non-Final Office Action received for U.S. Appl. No. 15/651,504 dated Dec. 31, 2019, 18 pages.

Non-Final Office Action received for U.S. Appl. No. 16/010,246 dated Dec. 5, 2019, 67 pages.

Stonebreaker et al. "Distributed RAID—A New Multiple Copy Algorithm.", IEEE ICDE, 1990, pp. 430-437.

Muralidhar et al. "f4: Facebook's Warm BLOB Storage System", USENIX. OSDI, Oct. 2014, pp. 383-398.

Final Office Action dated Feb. 12, 2020 for U.S. Appl. No. 16/024,314, 29 pages.

Non-Final Office Action received for U.S. Appl. No. 16/010,255 dated Jan. 9, 2020, 31 pages.

Office Action dated Feb. 5, 2020 for U.S. Appl. No. 16/261,551, 30 pages.

Non-Final Office Action received for U.S. Appl. No. 16/228,612 dated Feb. 27, 2020, 49 pages.

Final Office Action received for U.S. Appl. No. 16/010,246 dated Mar. 16, 2020, 33 pages.

Final Office Action received for U.S. Appl. No. 15/656,382 dated Apr. 6, 2020, 31 pages.

(56) References Cited

OTHER PUBLICATIONS

Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.

* cited by examiner

MITIGATING REAL NODE FAILURE IN A MAPPED REDUNDANT ARRAY OF INDEPENDENT NODES

TECHNICAL FIELD

The disclosed subject matter relates to data storage, more particularly, to mitigation of a failure of a real node in relation to a corresponding mapped redundant array of independent nodes of a mapped data storage system.

BACKGROUND

Conventional data storage techniques can store data in one or more arrays of data storage devices. As an example, data can be stored in an ECS (formerly known as ELASTIC CLOUD STORAGE) system, hereinafter an ECS system, such as is provided by DELL EMC. The example ECS system can comprise data storage devices, e.g., disks, etc., arranged in nodes, wherein hardware nodes, e.g., real nodes, etc., can be comprised in an ECS cluster, e.g., an NxM ECS cluster comprising N hardware nodes each having M real disks. One use of data storage is in bulk data storage. Data can conventionally be stored in a 'group of nodes' format for a given cluster, for example, in a conventional ECS system, all disks of nodes comprising the group of nodes, e.g., ECS cluster, etc., are considered part of the group. As such, a group with nodes having many disks can, in some conventional embodiments, comprise a large amount of storage, much of which can go underutilized. As an example, a storage group of five nodes, with ten disks per node, at 8 terabytes (TBs) per disk is roughly 400 TB in size, which can be excessively large for some types of data storage. Additionally, apportioning smaller real groups, e.g., groups having fewer real nodes, groups having real nodes with fewer real disks, groups having real nodes with smaller real disks, etc., can be inefficient in regards to processor, network, storage resources, etc., e.g., computer resource usage, to support these smaller groups. As such, it can be desirable to provide logical storage groups, and corresponding hardware, software, firmware, etc., at a more granular level to employ portions of larger real groups, thereby promoting more efficient computer resource usage, e.g., retaining a large real group(s) but providing a smaller logical group(s) that can be more suitable for storing some types of data, e.g., smaller amounts of data, slower access to data, etc., that otherwise can be inefficient to store in the example large real group(s).

DETAILED DESCRIPTION

Figure 1:
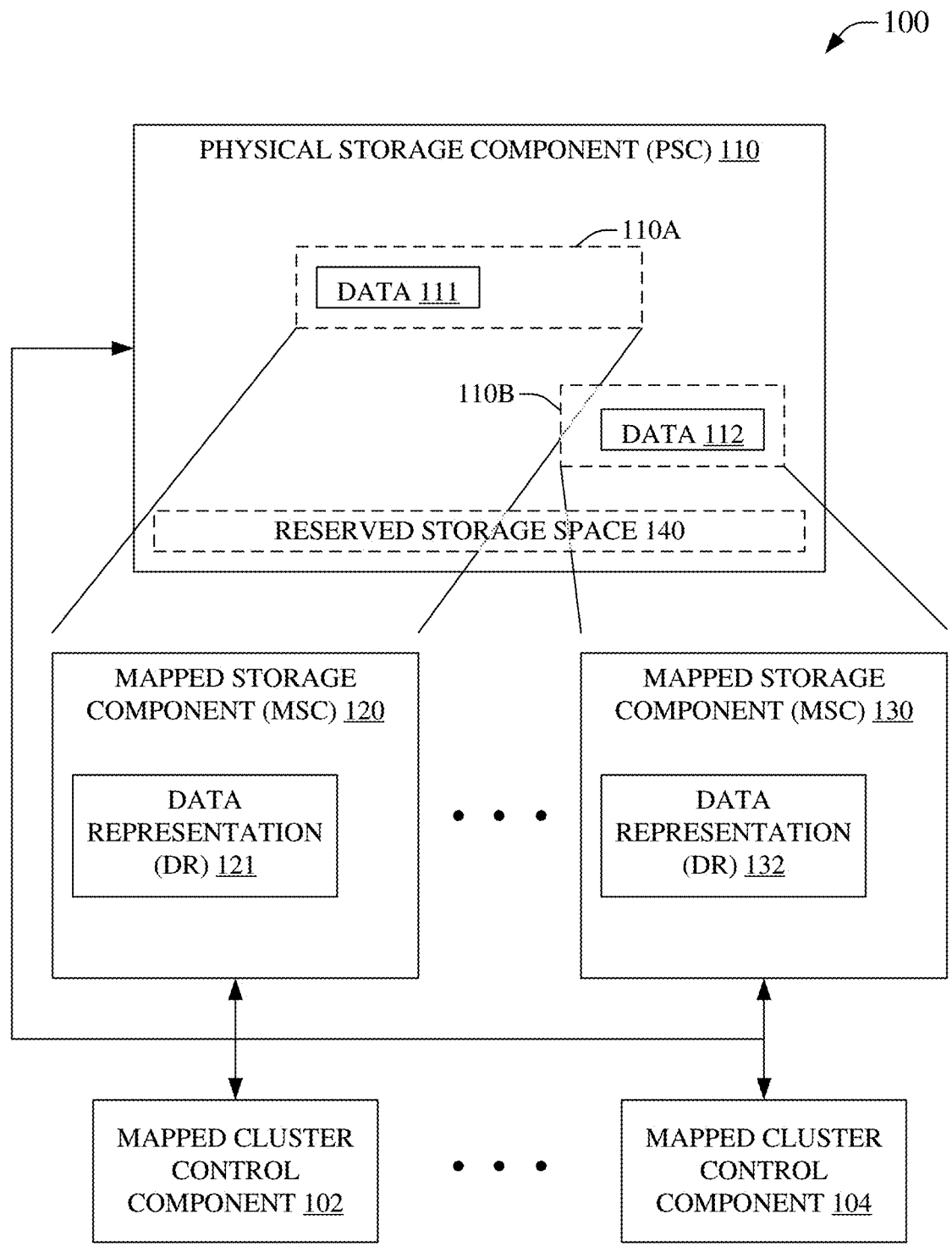
FIG. 1 is an illustration of an example system that can facilitate mitigation of a real node failure, by reserving real storage space, relative to a mapped redundant array of independent nodes, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in a redundant array of independent nodes (RAIN), also known as an ECS cluster, referred to herein as a 'real RAIN,' 'real cluster,' 'cluster,' etc. One use of data storage is in bulk data storage. Data can conventionally be stored in a real cluster, for example, in a conventional ECS system, a real cluster comprises all disks of the nodes comprised in the real cluster. As such, a real cluster having node(s) with many disks can, in some conventional embodiments, present a very large amount of storage, which, for some storage applications, can be underutilized. As such, it can be desirable to provide smaller amounts of storage while still being able to deploy large real clusters. This can be accomplished via logically apportioning portions of a real cluster into smaller clusters, e.g., a 'mapped redundant array of independent nodes,' hereinafter referred to as a 'mapped RAIN,' 'mapped cluster,' etc.

In an aspect, one or more mapped clusters can be built upon a real cluster(s), as examples, a mapped cluster can logically comprise all disks of all nodes of a real cluster(s) resulting a mapped cluster that is the same size as the real cluster(s), a first mapped cluster can use some nodes of a real cluster(s) and a second mapped cluster can use other nodes of the real cluster(s), a first mapped cluster can use some disks of the nodes of the real cluster and a second mapped cluster can use other disks of the nodes of the real cluster, a first mapped cluster can use some disks of some nodes of the real cluster and a second mapped cluster can use other disks of other nodes of the real cluster, etc. It is to be noted that the disks and nodes of the real cluster allocated to any mapped cluster need not be contiguous in the real cluster. Similarly, the mapped disks of the mapped cluster also need not be contiguous. It is to be noted that not all data storage space of the real cluster needs to be apportioned into mapped clusters, and rather, mapped clusters can employ some, none, or all of the data storage space of one or more real clusters. The mapped RAIN technology can provide smaller logical groups that can be used more efficiently for storing smaller amounts of data in contrast to storing the same data without mapping, e.g., directly in a real redundant array of independent nodes. As such, a mapped cluster can provide finer granularity of the data storage system. As an example, where the real cluster is 8×8, e.g., 8 nodes by 8 disks in each node (64 disk pool), then, for example, four mapped 4×4 clusters can be provided, wherein each of the four mapped 4×4 clusters is approximately ¼ the size of the real cluster, e.g., 16 disk pool for each mapped cluster. As a second example, given an 8×8 real cluster, 16 mapped 2×2 clusters can be provided where each mapped cluster is approximately 1/16 the size of the real cluster, e.g., each mapped cluster can comprise a 4 disk pool. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

A mapped RAIN can, in some embodiments, comprise a processor, a virtual processor executing on a real processor, a combination of real processors and virtual processors, etc., that can enable interaction with data "stored in a mapped cluster." The data stored in a mapped cluster can actually be stored on a portion of a disk of a node of a real cluster, but can be interacted with according to a logical relation to a representation said to be 'stored in the mapped cluster.' As such, writing data into an address of the mapped cluster can result in writing of the data into an address of the real cluster and association between the mapped cluster address and the real cluster address can be retained to allow other operations with the data. In an aspect, the retention of the real-to-mapped address relationship, e.g., mapped data corresponding to the real data, can be via nearly any technique, for example, via a mapping table, via a data structure, etc., and all such techniques are within the scope of the present disclosure. Additionally, the relationship is typically updatable, allowing, for example, movement of data at the real cluster to still relate to an unchanged mapped address, allowing movement of the mapped data to still relate to unmoved data at the real address, etc. As an example, where a node of a real cluster fails, the relationship to the mapped address can be updated to associate a redundant duplicate of the data of the real cluster to be associated with the mapped address, thereby allowing a user of the mapped cluster to operate on the data without disturbance. As another example, moving data in a mapped cluster environment can be decoupled from actually moving the data within the real cluster, e.g., the updated mapped address can be affiliated with the unchanged real address, etc. As a further example, a failure of a mapped node, which is not related to a failure of a real node, can be compensated for by providing access to the real data at the unchanged real cluster address via a redundant mapped cluster node. Numerous other examples of mapped RAIN technology are readily appreciable and are considered within the scope of the present disclosure even where not recited for clarity and brevity.

Other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a further example, a mapped cluster can comprise storage space from a first real cluster having hardware nodes in a first data center in Seattle, Wash., and a second data center having hardware nodes in Tacoma, Wash. As another example, a mapped cluster can comprise storage space from a first real cluster having hardware nodes in a first data center in Houston, Tex., and a second real cluster having hardware nodes in a data center in Mosco, Russia.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate mitigation of a real node failure, by reserving real storage space, relative to a mapped redundant array of independent nodes, in accordance with aspects of the subject disclosure. System 100 can comprise physical storage component (PSC) 110. PSC 110 can comprise a real cluster, portion of a real cluster, portions of more than one real cluster, multiple clusters, etc. PSC 110 can facilitate data operations, e.g., storing data, accessing data, deleting data, moving data, copying data, duplicating data, etc. In some embodiments, PSC 110 can be part of a geographically diverse storage system. In some embodiments, PSC 110 can support data convolving storage systems, for example storing an XOR chunk that is a representation of a data from a first chunk and a second chunk in a convolved form, etc.

In an aspect, data 111 can be stored at portion 110A of PSC 110. Data 111 can be stored in a data storage element of PSC 110. As an example, an addressable memory cell can comprise information representative of data 111. This example addressable memory cell, for example, can be comprised in a hard drive, disk, solid state storage device, optical storage medium, etc. In an aspect, portion 110A of PSC 110 can comprise the data storage element, a component comprising the data storage element, a portion of a component comprising the data storage element, portions or all of multiple components wherein they comprise the data storage element, etc. As an example, portion 110A of PSC 110 can comprise a disk than comprises the data storage element that stores information representing data 111. Data 111 can be interacted with, operated on, etc., via a communicative coupling to PSC 110, to a component comprised in portion 110A, etc. As an example, PSC 110 can be a real cluster comprising real nodes that each comprise real disks, wherein portion 110A is comprised in a portion of the real disks, wherein the real disks comprise data storage elements, and wherein a data storage element of the data storage elements can store information representing data 111, whereby the information representing data 111 can be written into the storage element via a communicative coupling between PSC 110 and another device such that the information representing data 111 is associated with an address (or other identifier) of the data storage element enabling operations/interactions with the information representing data 111. It will be noted that the term 'data 111' can be synonymous with the term 'information representing data 111' in that, for example, binary information representing the data is conventionally regarded as data 111, for example, a photo can be data 111 and the information representing the photo can also be regarded as data 111, etc., and this convention is employed in the instant disclosure for clarity and brevity, although where needed distinctions between the information representing data and the data itself can be indicated where noteworthy. Additionally, as is noted herein, PSC 110 can be a large data storage space, e.g., a real cluster of many nodes each having many large disks, etc., which can result in inefficient use of the storage space for many types of storage than can be more efficiently supported by a smaller data storage space. Accordingly, mapped RAIN technology, as disclosed, can provide more granular use of PSC 110.

Mapped storage component (MSC) 120 of system 100, and similarly MSC 130, etc., can logically represent a portion of PSC 110, e.g., portion 110A, etc., in a mapped cluster. A mapped cluster can therefore comprise a data representation (DR) of data stored in a portion of PSC 110, e.g., DR 121 can be a representation of data 111 of portion 110A of PSC 110, DR 132 can be a representation of data 112 of portion 110B of PSC 110, etc. MSC 120 can enable interactions with DR 121 that can propagate to data 111. Similarly, MSC 130 can enable interactions with DR 132 that can propagate to data 112. In some embodiments, MSC 120, 130, etc., can comprise mapped nodes having mapped disks, which can logically represent one or more portions of PSC 110, e.g., 110A, 110B, etc. A processor of MSC 120 can receive an instruction to perform an operation on DR 121, such as overwriting DR 121, etc., that can be translated by the processor and communicated to PSC 110 to cause data 111 to be overwritten. In an aspect, DR 121 can be correlated to data 111 via a mapped cluster control component, e.g., mapped cluster control component 102, mapped cluster control component 104, etc., such as via a mapping table, etc., to enable an operation directed to an address (or other identifier) of DR 121 to be translated into an operation directed to data 111 based on the correlation of DR 121 and data 111. As is noted herein, mapped RAIN can provide abstraction of one or more portions of a real cluster to enable data operations that can different levels of efficiency, speed, reliability, etc., than can be achieved by directly employing a real cluster for data operations.

In an aspect, mapped cluster control component(s), e.g., 102, 104, etc., can enable adaptation of DRs, e.g., 121, 132, etc., comprised in MSCs, e.g., 120, 130, etc., that can mitigate loss of a storage elements of PSC 110, e.g., loss of a real node, loss of a real disk, etc. In an embodiment the mitigation can substitute a storage element of reserved storage space 140 of PSC 110 to replace an inaccessible storage element of PSC 110. Accordingly, mapped cluster control component, e.g., 102, 104, etc., can facilitate adapting an affected MSC, e.g., MSC 120, 130, etc. The adapting can enable the affected MSC to rebuild from data redundantly stored on the affected MSC into the substituted mapped storage elements corresponding to the substituted real storage elements. As an example, where PSC 110 comprises eight nodes, each having seven available disks and one reserved disk, then the loss of one node can result in a loss of access to the corresponding seven available disks and one reserved disk. Where these disks are inaccessible due to the real node failure, the corresponding mapped disks of MSC 120, MSC 130, etc., can also become inaccessible. Continuing the example, mapped cluster control component 102, 104, etc., can enable substituting the seven remaining reserve real disks of the seven remaining accessible real nodes of PSC 110 for the seven inaccessible available disks of the example failed real node. This can result in corresponding substitute mapped disks in mapped node(s) of MSC 120, 130, etc. The MSCs, e.g., 120 130, etc., can rebuild to the substituted mapped disks, which can result in corresponding data being written to the substitute real disks. This can mitigate loss of a real node of a real cluster, e.g., PSC 110, etc., relative to a mapped cluster that can be affected by the loss of the real node.

It is noted that an MSC can rebuild stored data based on data redundancy controlled by the MSCs themselves and the rebuilding is generally not based on data redundancy controlled by the real cluster. As an example, an MSC can store data in a mapped cluster redundantly, e.g., across mapped nodes of the mapped cluster, etc., such that failure of mapped disks/mapped nodes can be recovered from via rebuilding from remaining data on the mapped cluster into other mapped disks/mapped nodes, which can be independent of any data redundancy feature of a real cluster supporting the MSC.

It is further noted that 'loss' of a node is intended to indicate that data of the node is less accessible due to nearly any type of software, hardware, network, etc., failure, nearly any type of data access restriction/failure, or other events that result in data being less accessible. As an example, a power outage can cause a real node of a real cluster to go into a power saving mode that can restrict access to data stored thereon, which can be regarded as a loss of the real node, despite the hardware, software, and network executing as designed, because the data has become less accessible. As another example, heavy network traffic can cause delays in accessing data of a real node of a real cluster, which can be regarded as a loss of the real node due to the data being less accessible, e.g., delays in data access are considered as reducing accessibility of the data. As a further example, a processor of a real node of a real cluster can fail, which can prevent access to data of the real node and can be regarded as a loss of the real node due to the data being inaccessible, e.g., until the processor is repaired, replaced, etc.

Figure 2:
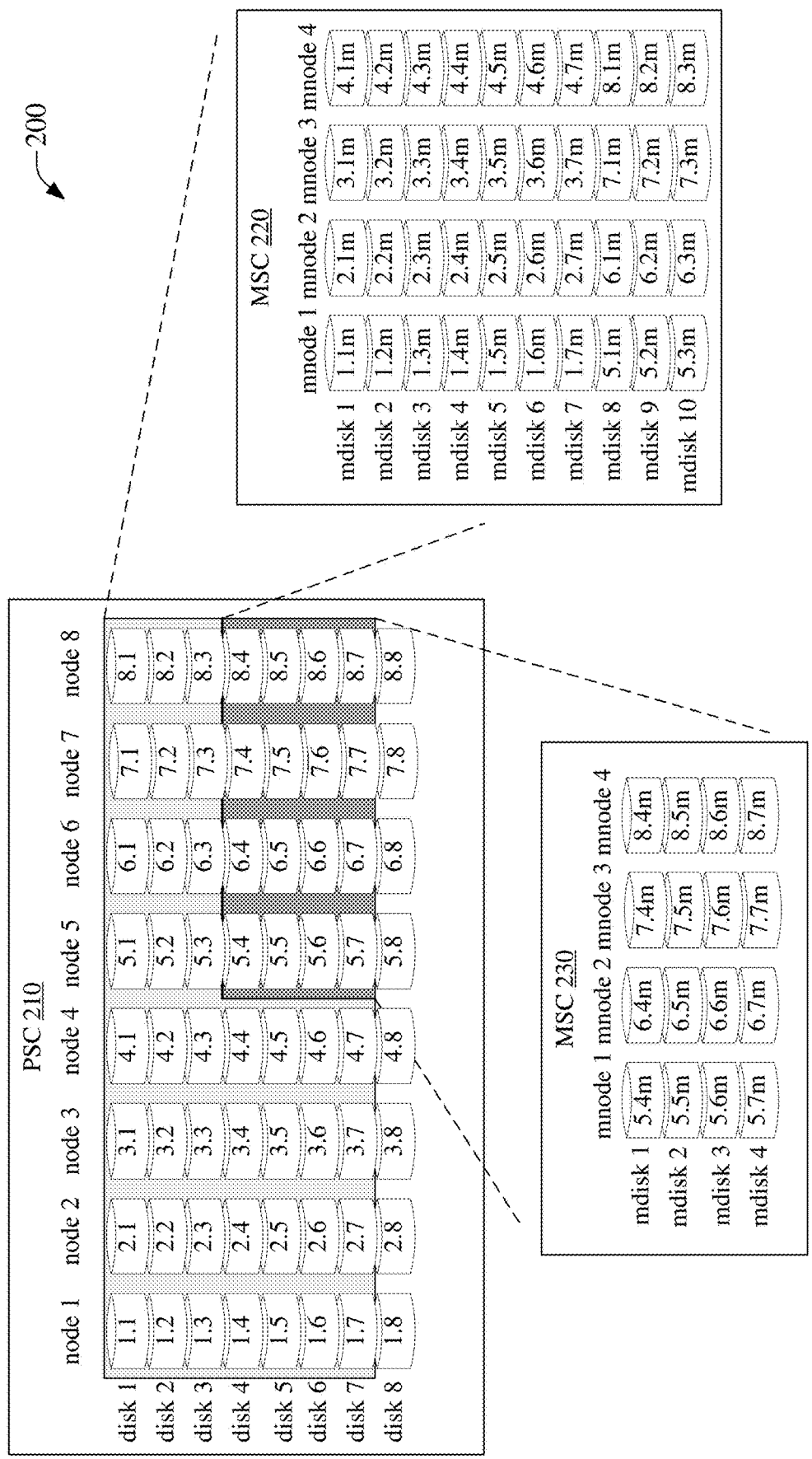
FIG. 2 is an illustration of an example system that can facilitate mitigation of a real node failure relative to a mapped cluster by reserving real storage components across multiple real nodes comprising the real node, in accordance with aspects of the subject disclosure.

FIG. 2 is an illustration of a system 200, which can enable mitigation of a real node failure relative to a mapped cluster by reserving real storage components across multiple real nodes comprising the real node, in accordance with aspects of the subject disclosure. System 200 can comprise PSC 210. PSC 210 can comprise a real cluster, portion of a real cluster, portions of more than one real cluster, multiple clusters, etc. PSC 210 can facilitate data operations, e.g., storing data, accessing data, deleting data, moving data, copying data, duplicating data, etc. In some embodiments, PSC 210 can be part of a geographically diverse storage system. In some embodiments, PSC 210 can support data convolving storage systems, for example storing an XOR chunk that is a representation of a data from a first chunk and a second chunk in a convolved form, etc.

In an aspect, data can be stored at a portion of PSC 210, e.g., via a data storage element of PSC. As an example, an addressable memory cell can comprise data. This example addressable memory cell can be comprised in a hard drive, disk, solid state storage device, optical storage medium, etc., for example disks 1.1 through 8.8, etc. It will be noted that a cluster can comprise more or fewer nodes, more or fewer disks, etc., without departing from the scope of the disclosed subject matter, as an example, PSC can be an N.M cluster comprising N nodes having M disks in each of the N nodes, etc. In an aspect, a portion of PSC 210 can comprise the data storage element, a component comprising the data storage element, a portion of a component comprising the data storage element, portions or all of multiple components wherein they comprise the data storage element, etc. As an example, a portion of PSC 210 can comprise a disk, e.g., one or more of disks 1.1 through 8.8, etc., that comprises the data storage element that stores data. The data can be interacted with, operated on, etc., via a communicative coupling with PSC 210, with a component comprised in a portion of PSC 210, etc. As an example, PSC 210 can be a real cluster comprising real nodes, e.g., node 1 through node 8, etc., that each comprise real disks, e.g., disk 1 through disk 8, correspondingly, etc. wherein a portion of PSC 210 is comprised in a subset of the set of disks 5.4 through 8.7 indicated by the dark grey shading, etc., wherein the disks 5.4 through 8.7, etc., comprise data storage elements, and wherein a data storage element of the data storage elements can store data, whereby the data can be written into the storage element via a communicative coupling between PSC 210 and another device, such that the data is associated with an address (or other identifier) of the data storage element enabling operations/interactions with the data. As is noted herein, PSC 210 can be a large data storage space, e.g., a real cluster of many nodes, e.g., N nodes, each having many large disks, e.g., M disks in each of the N nodes, etc., which can result in inefficient use of the storage space for many types of storage that can be more efficiently supported by a smaller data storage space. Accordingly, mapped RAIN technology, as disclosed, can provide more granular use of PSC 210.

System 200 can comprise an MSC, e.g., MSC 220, MSC 230, etc., that can logically represent a portion of PSC 210 as a mapped cluster. A mapped cluster can therefore comprise a DR of data stored in a portion of PSC 210, wherein the DR can correspond to data of the portion of PSC 210, etc. MSC 220 can enable interactions with the DR that can be propagated to the data. In some embodiments, MSCs can comprise mapped nodes, e.g., MSC 220 can comprise mnode 1 through mnode 4, etc., having mapped disks, e.g., 1.1 m, 1.2 m, . . . , 8.2 m, 8.3 m, etc., which can logically represent a portion of PSC 210, e.g., mapped disk 3.3 m of MSC 220 can correspond to disk 3.3 of PSC 210 in the light grey shaded area of PSC 210, etc. In an embodiment, a processor of an MSC can receive an instruction to perform an operation on a DR that can be translated by the processor and communicated to PSC 210 to cause an operation with corresponding data of PSC 210. In an aspect, a DR can be correlated to data of PSC 210 to enable an operation directed to an address (or other identifier) of the DR to be translated into an operation directed to an address of corresponding data in PSC 210 based on the correlation of DR and the data of PSC 210, e.g., reading, writing, overwriting, updating, deleting, moving, copying, duplicating, etc., directed at a DR can be performed on corresponding data of PSC 210. As is noted herein, mapped RAIN can provide abstraction of one or more portions of a real cluster to enable data operations that can different levels of efficiency, speed, reliability, etc., than can be achieved by directly employing a real cluster for data operations.

System 200 can further comprise reserved disks, e.g., disks 1.8 through 8.8 of PSC 210, etc. In an embodiment, the reserved disks can correlate to a count of disks that can be lost in PSC 210, e.g., where a selected loss tolerance value 'L' indicates that reserve disks be held to protect against the loss of one node and, for example, there are 8 disks in a node, e.g., L=1→1 node→8 reserve disks, then one reserve disk can be designated in each of the eight nodes. In this example, if any one node fails, then there remain seven reserve disks that can be substituted for the seven less accessible disks of the failed node. Where L=2, 3, . . . , etc., additional disks can be reserved corresponding to a count of disks that can be lost when L nodes are lost. As an example, for a 128 node real cluster having 64 disks per node, and for L=2, then 128 disks can be reserved, however failure of only one node can result in substitution of only 63 of the reserved disks as substitutes for the 63 less accessible disks of the failed node that also comprises a now less accessible reserve disk.

Generally, the reserve disks can be distributed among the nodes of the real cluster. In an aspect, where knowledge of which node will become less accessible is unavailable, it can be desirable to distribute the reserve disks in a manner that reduces a likelihood of insufficient reserve disks being available for mitigation of a loss of a real node. As an example, distributing eight reserve disks across eight nodes of a an 8.8 real cluster results in losing only one reserve disk for the loss of any one node of the 8.8 real cluster and, further, also results in having seven accessible reserve disks as substitutes for the less accessible seven disks of failed node. As another example, reserving four disks in each of two nodes of the example 8.8 real cluster can result in loss of four of the reserve disks where one of the two nodes fails, which can still leave four available reserve disks as substitutes for the four less accessible disks of the failed node where it is noted that the failed node comprises eight disks where four were reserve disks and four were available disks. As a further example, an extra node can comprise the reserve disks, although this results in use of additional computing resources dedicated to operation of the extra node that is merely held in reserve, e.g., an 8.8 real cluster can be expanded to an 9.8 real cluster, e.g., 8×8 active portion+1×8 reserve portion, such that the loss of any of the active nodes of the 9.8 cluster can be mitigated by substitution of the reserve node. Whereas this third example can consume additional computing resources, e.g., an additional node controller/processor(s), memory, networking, etc., to support disks held in reserve, it can be a less favored distribution technique in contrast to distribution of the reserve disks among the other already available nodes, e.g., it can take little additional computing resources to reserve a disk in an available node in contrast to the computing resources needed to hold an entire reserve node in a real cluster.

Figure 3:
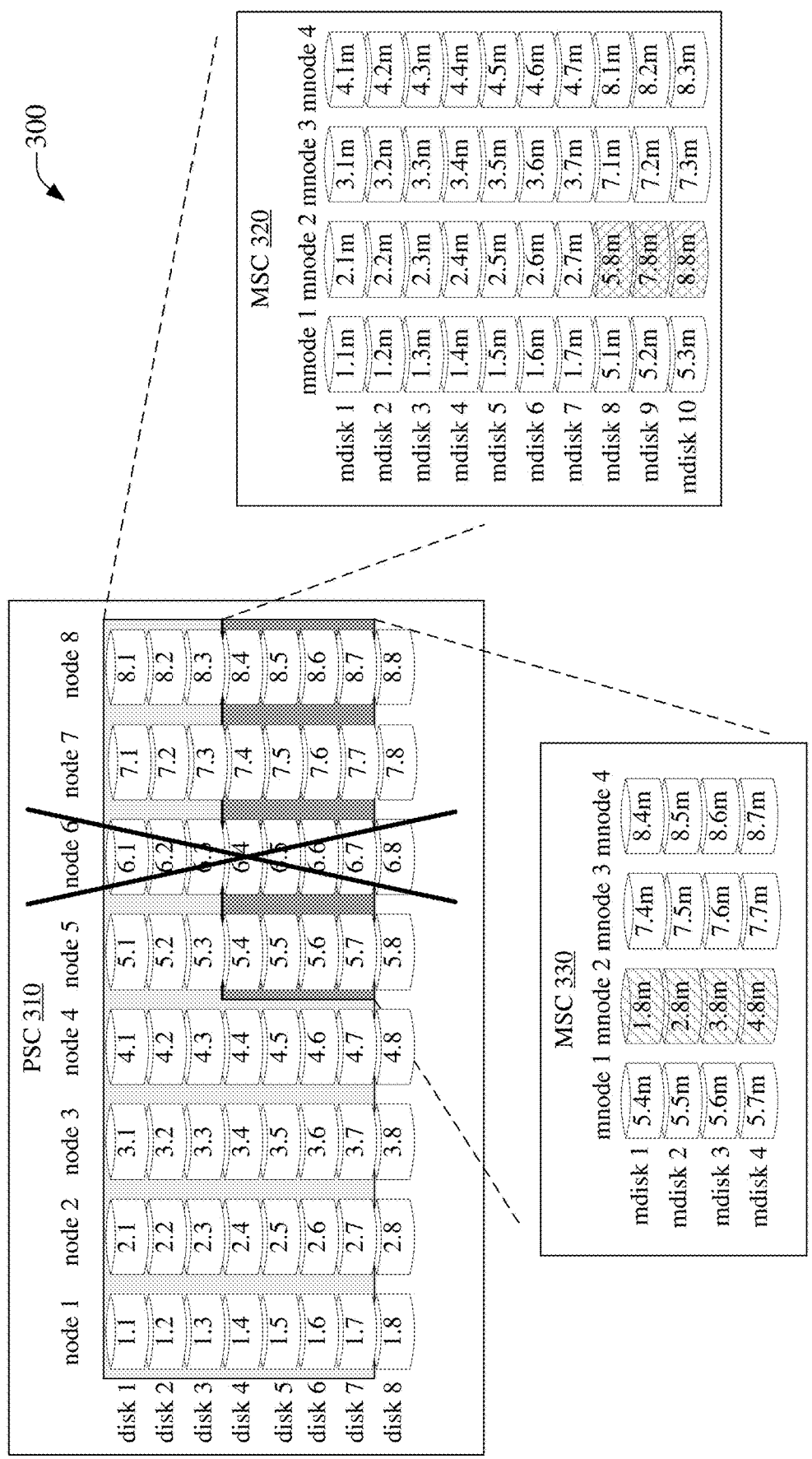
FIG. 3 is an illustration of an example system that can enable rebuilding mapped nodes of a mapped cluster to mitigate a real node failure, in accordance with aspects of the subject disclosure.

FIG. 3 is an illustration of a system 300, which can facilitate rebuilding mapped nodes of a mapped cluster to mitigate a real node failure, in accordance with aspects of the subject disclosure. System 300 can comprise PSC 310. PSC 310 can comprise a real cluster, portion of a real cluster, portions of more than one real cluster, multiple clusters, etc. PSC 310 can facilitate data operations, e.g., storing data, accessing data, deleting data, moving data, copying data, duplicating data, etc. In some embodiments, PSC 310 can be part of a geographically diverse storage system. In some embodiments, PSC 310 can support data convolving storage systems, for example storing an XOR chunk that is a representation of a data from a first chunk and a second chunk in a convolved form, etc.

In an aspect, data can be stored at a portion of PSC 310, e.g., via a data storage element of PSC. As an example, an addressable memory cell can comprise data. This example addressable memory cell can be comprised in a hard drive, disk, solid state storage device, optical storage medium, etc., for example disks 1.1 through 8.8, etc. It will be noted that a cluster can comprise more or fewer nodes, more or fewer disks, etc., without departing from the scope of the disclosed subject matter, as an example, PSC can be an N.M cluster comprising N nodes having M disks in each of the N nodes, etc. In an aspect, a portion of PSC 310 can comprise the data storage element, a component comprising the data storage element, a portion of a component comprising the data storage element, portions or all of multiple components wherein they comprise the data storage element, etc. As an example, a portion of PSC 310 can comprise a disk, e.g., one or more of disks 1.1 through 8.8, etc., that comprises the data storage element that stores data. The data can be interacted with, operated on, etc., via a communicative coupling with PSC 310, with a component comprised in a portion of PSC 310, etc. As an example, PSC 310 can be a real cluster comprising real nodes, e.g., node 1 through node 8, etc., that each comprise real disks, e.g., disk 1 through disk 8, correspondingly, etc., wherein a portion of PSC 310 is comprised in a subset of the set of disks 5.4 through 8.7 indicated by the dark grey shading, etc., wherein the disks 5.4 through 8.7, etc., comprise data storage elements, and wherein a data storage element of the data storage elements can store data, whereby the data can be written into the storage element via a communicative coupling between PSC 310 and another device, such that the data is associated with an address (or other identifier) of the data storage element enabling operations/interactions with the data. As is noted herein, PSC 310 can be a large data storage space, e.g., a real cluster of many nodes, e.g., N nodes, each having many large disks, e.g., M disks in each of the N nodes, etc., which can result in inefficient use of the storage space for many types of storage that can be more efficiently supported by a smaller data storage space. Accordingly, mapped RAIN technology, as disclosed, can provide more granular use of PSC 310.

System 300 can comprise an MSC, e.g., MSC 320, MSC 330, etc., that can logically represent a portion of PSC 310 as a mapped cluster. A mapped cluster can therefore comprise a DR of data stored in a portion of PSC 310, wherein the DR can correspond to data of the portion of PSC 310, etc. The MSC can enable interactions with the DR that can be propagated to the data. In some embodiments, MSCs can comprise mapped nodes. As an example, MSC 320 can comprise an mnode 1 through an mnode 4, etc., having mapped disks, e.g., 1.1 m, 1.2 m, . . . , 8.2 m, 8.3 m, etc., which can logically represent a portion of PSC 310, such as the light grey shaded portion of PSC 310, etc., wherein, for example, mapped disk 3.3 m of MSC 320 can correspond to disk 3.3 of PSC 310 in the light grey shaded area of PSC 310, etc. As another example, MSC 330 can comprise an mnode 1 through an mnode 4, etc., having mapped disks, e.g., 5.4 m, 5.5 m, . . . , 7.7 m, 8.7 m, etc., which can logically represent a portion of PSC 310, such as the dark grey shaded portion of PSC 310, wherein, for example, mapped disk 7.5 m of MSC 330 can correspond to disk 7.5 of PSC 310 in the dark grey shaded area of PSC 310, etc. It is noted that node 6 of PSC 310, e.g., a real node of the real cluster, can correspond to mapped disks of MSCs, e.g., before failure of node 6, disks 6.1, 6.2, and 6.3 can correspond to mnode disks at mdisk 8, 9, and 10, though system 300 is illustrated after substitution. It is further noted that similarly, disks 6.4-6.7 of real node 6 can correlate to the mapped disks of mnode 2 comprised in MSC 330, but again, system 300 is illustrated after substitution of reserved disks.

System 300 can comprise reserved disks, e.g., disks 1.8 through 8.8 of PSC 310, etc. In an embodiment, the reserved disks can correlate to a count of disks that, if lost from PSC 310, can be tolerated, e.g., a loss tolerance value 'L' multiplied by a count of accessible disks per node. As such, where L=1 and there are eight accessible disks, including one reserve disk per node, then the count of disks to be held in reserve can be eight reserve disks distributed among the example eight nodes.

In system 300, failure of real node 6 can affect three mapped nodes corresponding to the light grey mapped portion, four mapped nodes corresponding to the dark grey mapped portion, and one reserve disk, e.g., 6.8 is a reserve disk that is less accessible due to the loss of real node 6. As is illustrated, the remaining seven reserve disks, e.g., 1.8 through 8.8, excluding 6.8, can be substituted for the storage space previously accorded to disks 6.1 through 6.7. Accordingly, these substituted real disks can be similarly substituted into the mapped clusters. In an embodiment, MSC 320 can be provided substitute storage space via reserve real disks 5.8, 7.8, and 8.8, which can be indicated as 5.8 m, 7.8 m, and 8.8 m respectively in the mapped cluster. In a similar embodiment, MSC 330 can include available mapped storage space for mnode 2 that can correspond to reserved real disks 1.8, 2.8, 3.8 and 4.8.

It is noted that the substituted real space and corresponding mapped storage space will typically not contain the lost data that was stored on the real disks of lost node 6 of PSC 310. As such, the MSC can treat the substituted mapped disks as 'new mapped disks,' e.g., that the substituted mapped disks, corresponding the substituted real disks, do not contain useable data. Accordingly, the MSCs can then rebuild to stored data to the 'new disks' based, for example, on data redundancy and repair technology of the MSC. As an example, MSC 330 can comprise redundant data allowing for the loss of any one mapped node and, accordingly, when a mapped node, e.g., mnode 2, is lost as a result of the loss of real node 6 of PSC 310, MSC 330 can rebuild the cluster via writing data into the substituted disks in mnode 2, e.g., 1.8 m, 2.8 m, 3.8 m, and 4.8 m, based on the data already existing in a redundant format on the mapped disks of mnode 1, 3, and 4. This can occur without PSC 310 directly managing restoration of data lost when real node 6 is lost. In an aspect, PSC 310 can simply make reserve disks available to the mapped clusters to allow the mapped clusters to restore themselves via the substituted disks. This can alleviate PSC 310 being designed to manage redundant data.

In an aspect, it is to be noted that the redundant nature of the MSCs can be supported with fewer reserve disks than might otherwise be needed. It can be observed that both MSC 320 and MSC 330 can recover due to their redundant data via the eight reserved real disks, as described herein. It will be appreciated that were each of the MSCs to manage their own reserved disks, then MSC 320 would typically reserve 10 disks and MSC 330 would typically reserve four disks, for a total of 14 reserved disks. This is greater than the eight reserved real disks and the corresponding representations as reserved mapped substitute disks. This can enable providing reserve disk capacity via the real cluster, e.g., via substitution of a real disk, via mapping as a substitute mapped disk, to replace a mapped disk that corresponded to a lost disk, which can be more efficient than providing reserve disk capacity via individual mapped clusters.

Figure 4:
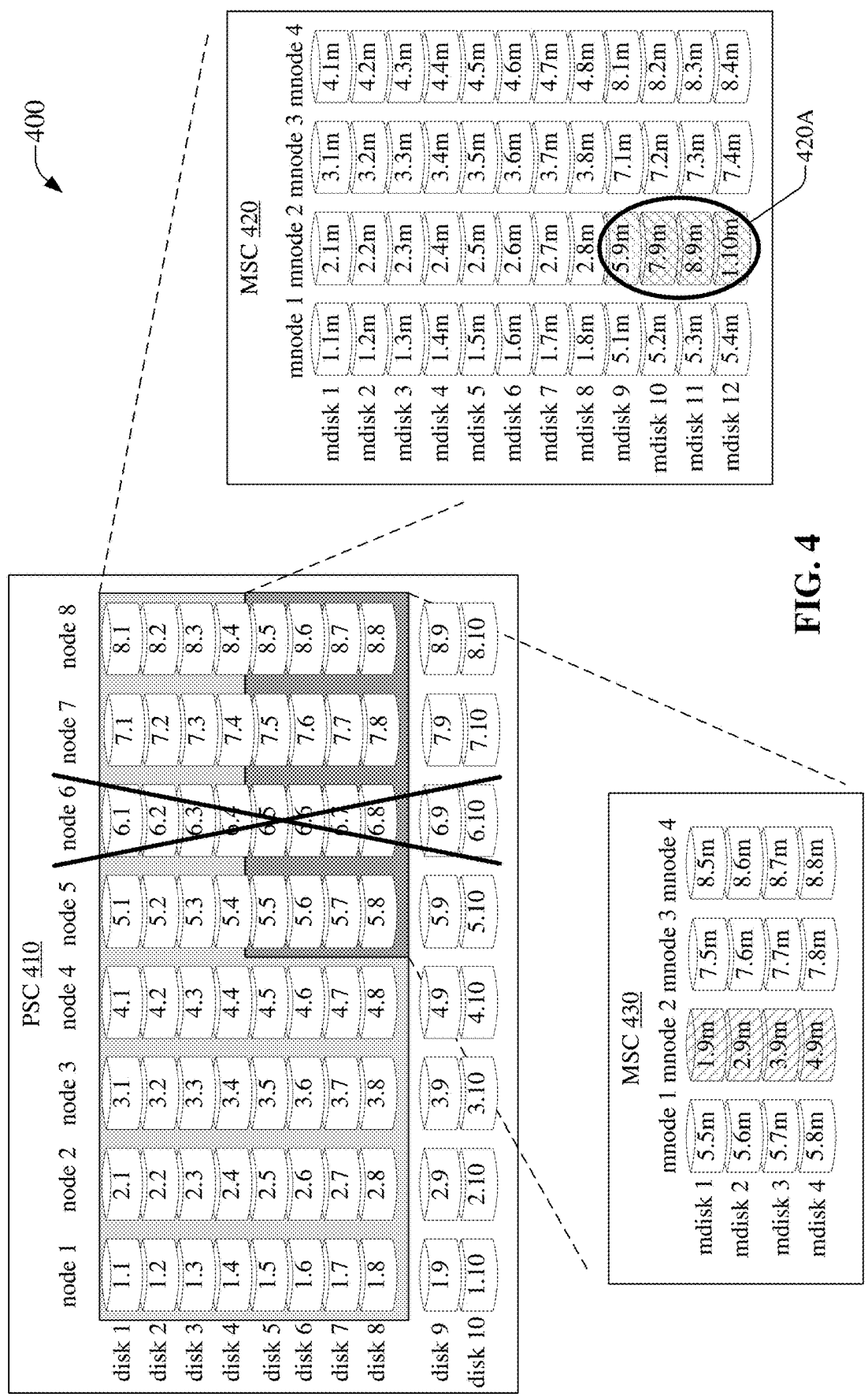
FIG. 4 illustrates an example system that can facilitate rebuilding mapped nodes of a mapped cluster, having different data protection levels that mitigate a real node failure, in accordance with aspects of the subject disclosure.

FIG. 4 is an illustration of a system 400, which can enable rebuilding mapped nodes of a mapped cluster, having different data protection levels that mitigate a real node failure, in accordance with aspects of the subject disclosure. System 400 can comprise PSC 410, which can be a real cluster or a portion thereof. Data can be stored at a portion of PSC 410. As an example, a portion of PSC 410 can comprise a disk, e.g., one or more of disks 1.1 through 8.10, etc., that comprises the data storage element that stores data. PSC 410 can be a real cluster comprising real nodes, e.g., node 1 through node 8, etc., that each comprise real disks, e.g., disk 1 through disk 10, correspondingly, etc., wherein a portion of PSC 410 can be comprised in a subset of the set of disks, e.g., disks 5.5 through 8.8 can be mapped to MSC 430 as indicated by the dark grey shading, etc. Similarly, MSC 420 can map to the light grey shaded portion of PSC 410. Accordingly, MSCs, e.g., MSC 420, MSC 430, etc., can logically represent a portion of PSC 410 as a mapped cluster. A mapped cluster can therefore comprise a DR of data stored in a portion of PSC 410, wherein the DR can correspond to data of the portion of PSC 410, etc. The MSC can enable interactions with the DR that can be propagated to the data in the real cluster. PSC 410 can further comprise reserve disks distributed among the example 8 real nodes, e.g., disks 9 and 10 of each of nodes 1 to 8.

System 400 illustrates a loss of real node 6, and therefore a corresponding loss of the real disks supporting mapped disks in mapped nodes of the MSCs, e.g., the lost disks of the light and dark grey shaded areas can correspond to lost mapped disks of MSC 420, 430, etc., as is indicated by the cross hatched disks. System 400 illustrates that the cross hatched disks of the MSCs have been provided with substituted mapped disks corresponding to some of the reserved disks of PSC 410. As an example, mapped disk 1.9 m of mnode 2 of MSC 430 is a substitute for the mapped disk that was at mdisk 1 mnode 2 of MSC 430 and that corresponded to real disk 6.5 of PSC 410 before the loss of real node 6. As a second example, mapped disk 1.10 m of mnode 2 of MSC 420 is a substitute for the mapped disk that was at mdisk 12 mnode 2 of MSC 420 and that corresponded to real disk 6.4 of PSC 410 before the loss of real node 6. Further examples are readily appreciated and are not explicitly recited for the sake of clarity and brevity. All such other examples, despite not being explicitly recited, are within the scope of the instant disclosure. Accordingly, each of MSC 420, MSC 430, etc., can rebuild to the mapped cluster to the substituted mapped disks based on redundant data stored on the MSC.

In an embodiment, MSC 430 can comprise substituted mapped disks that correspond to substituted reserved real disks in response to loss of real node 6 and the associated loss of corresponding mapped disks. It this embodiment, it will be noted that the substitute mapped disks preserve node diversity. Node diversity can be related to a best practice that no one real node of a real cluster should correspond to more than one mapped node of a single mapped cluster. Node diversity can provide data protection in that the loss of one real node should not correspond to the loss of more than one mapped node because no two mapped nodes should comprise mapped disks corresponding to real disks of a single real node. As can be observed in system 400 for MSC 430, no one node of remaining real nodes 1-5 and 7-8 correspond to a mapped disk in more than one mapped node of MSC 430. As such, after MSC 430 has rebuilt to the substituted disks of mnode2, a further loss of an additional real node in PSC 410, for example losing real node 5, should not result in a data loss in MSC 430.

In contrast, MSC 420 illustrates a different level of data protection because MSC 420 does not have node diversity after the substitution of reserve disks. Prior to the failure of real node 6, MSC 420 can have been node diverse, e.g., mdisk 9-mdisk 12 of mnode 2 can have comprised mdisks 6.1 m to 6.4 m that corresponded to real disks 6.1 to 6.4 and, accordingly, no one real node corresponded to more than one mapped node of MSC 420. Upon loss of real node 6, the substituted real disks 5.9, 7.9, 8.9, and 1.10, corresponding to the mapped disks in portion 420 A of MSC 420, cause MSC 420 to lack node diversity, e.g., a subsequent loss of real node 5 would result in loss of mnode 1 and 2 of MSC 420, a subsequent loss of real node 7 would result in loss of mnode 2 and 3 of MSC 420, a subsequent loss of real node 8 would result in loss of mnode 2 and 4 of MSC 420, or a subsequent loss of real node 1 would result in loss of mnode 1 and 2 of MSC 420. Where MSC 420 is selected to be resistant to loss of any one mapped node, the loss of more than one mapped node can result in a loss of logical data, e.g., the real data can still exist in the real storage element of the real cluster, but mapped cluster can have insufficient information to access the mapped data of the multiple lost mapped nodes of the mapped cluster. Accordingly, MSC 430 can have greater data protection, e.g., being able to withstand a loss of a second real node of system 400, than MSC 420 which may undergo a data loss event if there is a loss of second real node of system 400. It can be desirable to preserve node diversity in relation to mitigating the loss of a real node corresponding to a mapped cluster.

Figure 5:
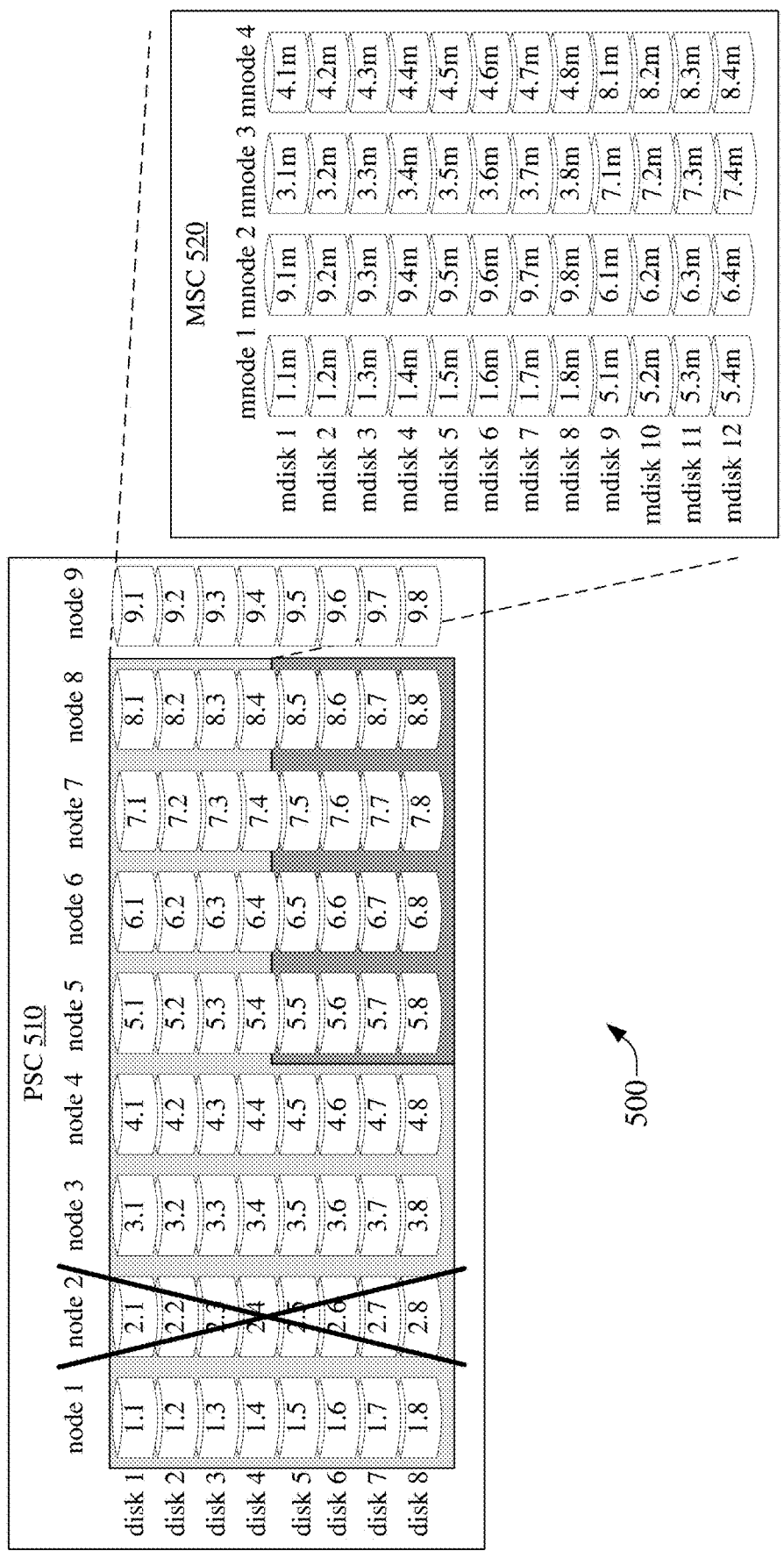
FIG. 5 illustrates an example system that can facilitate rebuilding mapped nodes of a mapped cluster via a reserved real node of a real cluster to mitigate failure of a real node of the real cluster, in accordance with aspects of the subject disclosure.

FIG. 5 is an illustration of a system 500, which can enable rebuilding mapped nodes of a mapped cluster via a reserved real node of a real cluster to mitigate failure of a real node of the real cluster, in accordance with aspects of the subject disclosure. System 500 can comprise MSC 520 that, for example, can comprise mapped disks corresponding to the light grey shaded portion of the real cluster, e.g., PSC 510. As noted herein, loss of a real node can be mitigated by providing reserve storage space in a real cluster. As is also disclosed herein, mitigating loss of real node by providing substitute real disks and corresponding substitute mapped disks to affected MSCs can, in some instances, result in loss of node diversity. Node diversity can be desirable to provide protection against forms of data loss.

In an aspect, PSC 510 can provide reserve storage space in the form of a reserve node, e.g., real node 9 can be a reserve node that does not actively participate in data storage for mapped clusters but can become available where another real node fails. As is noted herein, providing a reserve node can relate to increases in computer resource consumption. However, providing a reserve node can also provide for preservation of node diversity in substituting reserve disks and corresponding reserve mapped disks.

System 500 is illustrated after failure of real node 2, where real node two corresponded to mnode 2 of MSC 520 before the failure of real node 2. In response to the failure of real node 2, real node 9 can be substituted, e.g., the reserve node can be made available in response to the loss of another real node. Accordingly, MSC 520 is depicted as comprising mapped disks in mnode 2 corresponding to the real disks of real node 9. These substitute mapped disks can then be employed in rebuilding MSC 520 based on the redundant data storage of MSC 520. Moreover, MSC 520 is still node diverse after the substitution of mapped disks 9.1 m through 9.8 m, e.g., even after the substitution of the reserved disks, no one real node corresponds to more than one mapped node of MSC 520. As such, use of a reserve node, while likely to consume more computer resources, can provide for node diversity being preserved where a system mitigates the loss of real node of real cluster that affects a mapped cluster.

Figure 6:
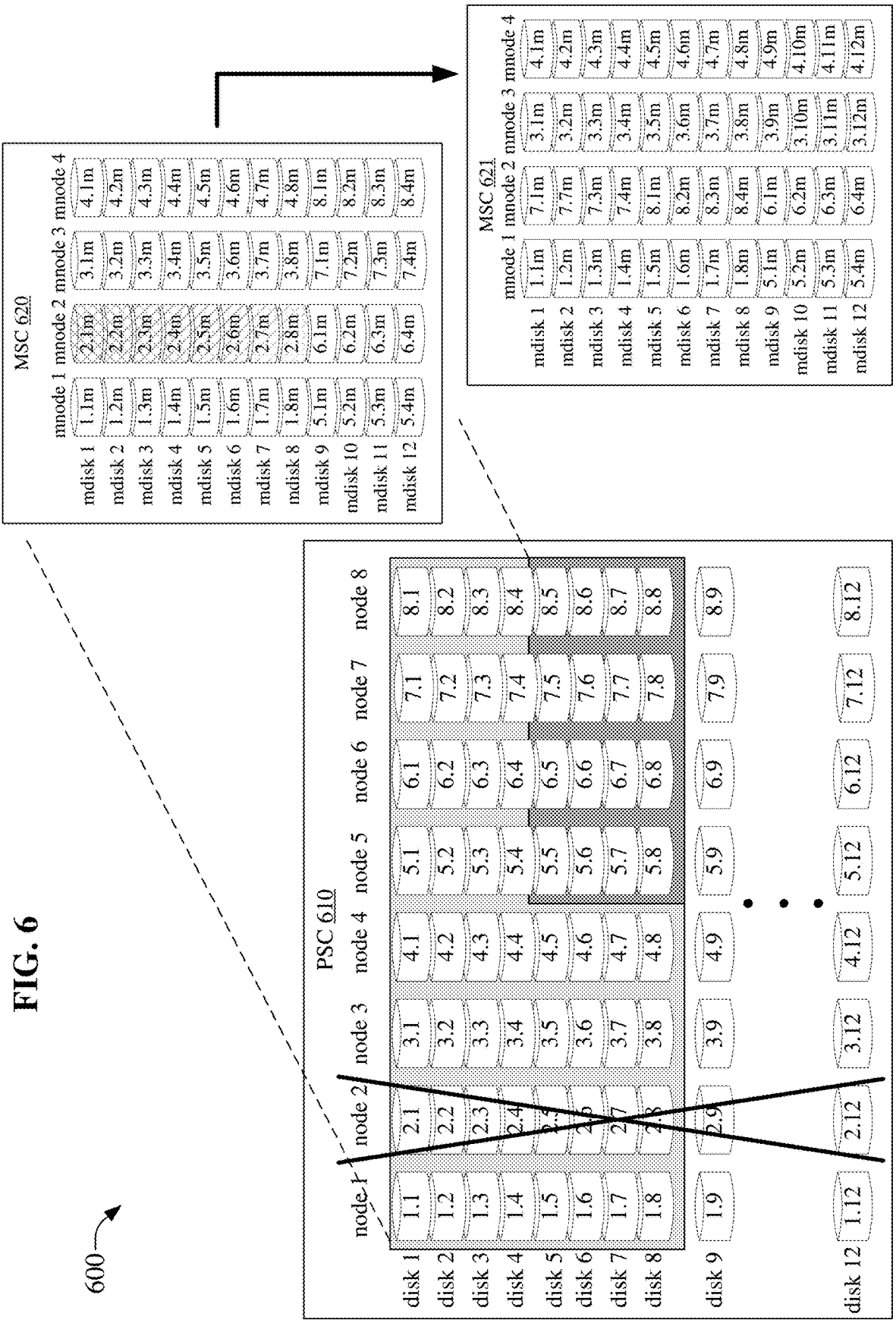
FIG. 6 illustrates an example system that can facilitate rebuilding mapped nodes of a mapped cluster via reserved storage components of non-reserved real nodes of a real cluster to mitigate failure of a real node of the real cluster, in accordance with aspects of the subject disclosure.

FIG. 6 is an illustration of a system 600 that can facilitate rebuilding mapped nodes of a mapped cluster via reserved storage components of non-reserved real nodes of a real cluster to mitigate failure of a real node of the real cluster, in accordance with aspects of the subject disclosure. System 600 can comprise MSC 620 that, for example, can comprise mapped disks corresponding to the light grey shaded portion of the real cluster, e.g., PSC 610. As noted herein, mitigating loss of a real node by providing substitute real disks, and corresponding substitute mapped disks to affected MSCs, can result in loss of node diversity for the affected MSC. Node diversity can be desirable to provide protection against forms of data loss.

In an aspect, PSC 610 can provide reserve storage space in the form of reserve disks distributed among the several available real nodes, e.g., PSC 610, for example, does not comprise a reserve node but rather comprises reserve real disks in the existing real nodes. This can avoid operation and support of a reserve node that can relate to increases in computer resource consumption that can be greater than supporting reserve disks in existing real nodes.

System 600 is illustrated after failure of real node 2, where real node two corresponded to the cross hatched portions of mnode 2 of MSC 620 before the failure of real node 2. In response to the failure of real node 2, other reserve real disks real nodes 1 and 3-8 can be substituted for the lost real disks of real node 2. Accordingly, MSC 620 can be provided with corresponding substitute mapped disks, e.g., replacing the lost mapped disks 2.1 m through 2.8m. As noted, this can result in loss of node diversity.

In an embodiment, node diversity can be preserved by adapting MSC 620, for example resulting in MSC 621, such that the substituted mapped disks are absorbed to prevent mapped disks of more than one mapped node of MSC 621 from corresponding to real disks of one node of PSC 610. In this example adaptation of MSC 620 into MSC 621, mapped disks 7.1 m through 7.4 m and 8.1 m through 8.4 m, which previously were associated mnodes 3 and 4, can be moved to mnode 2 at mdisk 1 through 8 of MSC 621. Similarly, the substitute mapped disks 3.9 m through 3.12 m, corresponding to real disk 3.9 to 3.12, can be assigned to mnode 3 from mdisk 9-12, and the substitute mapped disks 4.9 m through 4.12 m, corresponding to real disks 4.9 to 4.12, can be assigned to mnode 4 from mdisk 9-12, of MSC 621. The adaptation of MSC 620, resulting in MSC 621, in response to mitigating loss of a real node via substitution of reserved storage capacity distributed among real nodes of a real cluster can therefore be performed in a manner that preserves node diversity in MSC 621. It can be observed that subsequent loss of any one node of PSC 610 should not result in a corresponding loss of more than one mapped node of MSC 621.

Figure 7:
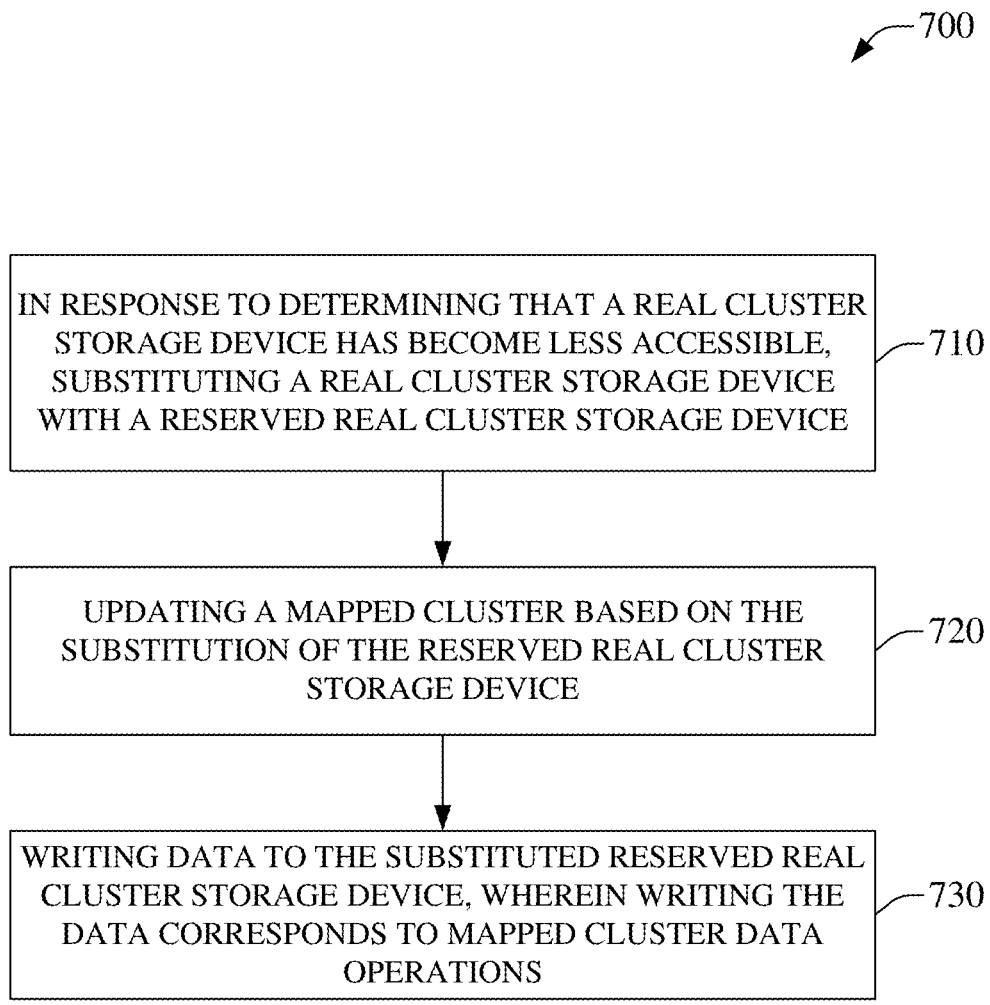
FIG. 7 is an illustration of an example method facilitating mitigating a real node failure, via reserved real storage space, relative to a mapped cluster, in accordance with aspects of the subject disclosure.
Figure 8:
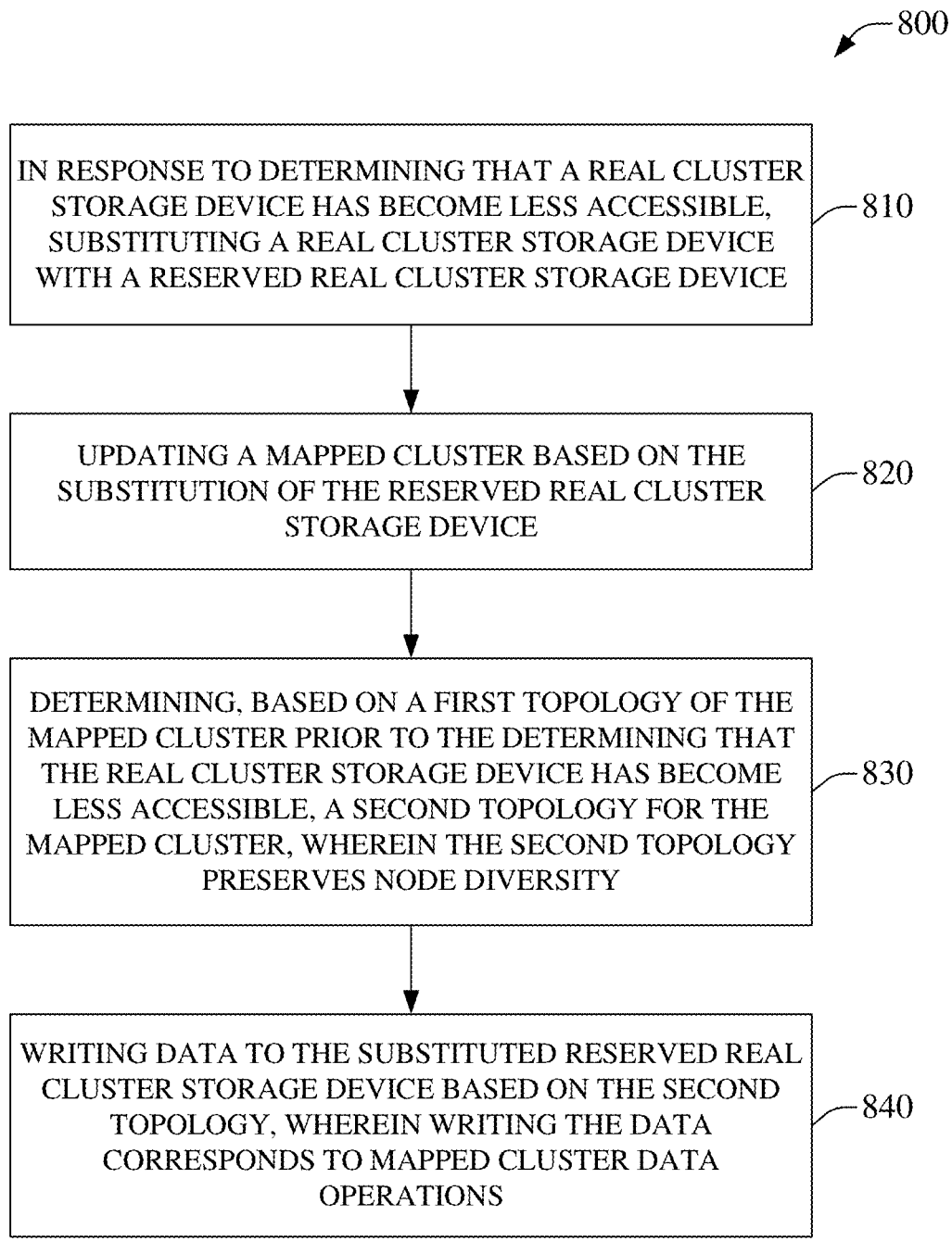
FIG. 8 illustrates an example method that enables rebuilding mapped nodes of a mapped cluster via a reserved storage component of a first real node of a real cluster to mitigate failure of a second real node of the real cluster, in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 is an illustration of an example method 700, which can facilitate mitigating a real node failure, via reserved real storage space, relative to a mapped cluster, in accordance with aspects of the subject disclosure. At 710, method 700 can comprise substituting a real cluster storage device with a reserved real cluster storage device. The substituting can be in response to determining that the real cluster storage device has become less accessible. In an embodiment the reserved real cluster storage device can be selected from reserved real cluster storage devices of the real cluster. As an example the reserved real cluster storage devices can be distributed among real nodes of the real cluster. As another example, the reserved real cluster storage device can be comprised in a reserved real node of the real cluster. The reserved real cluster storage device can be distinguished from available real cluster storage devices that can be designated for use in storing data for one or more corresponding mapped clusters, where the available real storage device can be actively in use or can be unused but still available for use as compared to held in reserve for use in mitigating the effects of another failed real cluster storage device.

At 720, method 700 can comprise updating a mapped cluster based on the substitution of the reserved real cluster storage device. In an aspect, failure of the real cluster storage device, which can be mitigated by substituting the reserved real cluster storage device, can correspond to a loss of a mapped storage device of the mapped cluster, wherein the mapped storage device corresponded to the now failed real cluster storage device. As such, updating the mapped cluster can result in substituting a new mapped storage device, e.g., corresponding to the substituted real cluster storage device, for the lost mapped storage device.

At 730, method 700 can comprise writing data to the substituted reserved real cluster storage device. At this point method 700 can end. In an aspect, updating the mapped cluster to comprise the new mapped storage device in place of the lost mapped storage device can enable the mapped cluster to use the new mapped storage device, for example, to rebuild the cluster after the loss of the mapped storage device. In this regard, use of the new mapped storage device can correspond to the mapped cluster writing data to the new mapped cluster, which data can be propagated to the substituted reserved real cluster storage device. In an embodiment, this can mitigate the effects of losing a real cluster storage device on a mapped cluster.

FIG. 8 is an illustration of an example method 800, which can enable rebuilding mapped nodes of a mapped cluster via a reserved storage component of a first real node of a real cluster to mitigate failure of a second real node of the real cluster, in accordance with aspects of the subject disclosure. At 810, method 800 can comprise substituting a real cluster storage device with a reserved real cluster storage device. The substituting can be in response to determining that the first real cluster device has become less accessible. In an embodiment the reserved real cluster storage device can be selected from reserved real cluster storage devices of the real cluster. As an example the reserved real cluster storage devices can be distributed among real nodes of the real cluster. As another example, the reserved real cluster storage device can be comprised in a reserved real node of the real cluster. The reserved real cluster storage device can be distinguished from available real cluster storage devices that can be designated for use in storing data for one or more corresponding mapped clusters, where the available real storage device can be actively in use or can be unused but still available for use as compared to held in reserve for use in mitigating the effects of another failed real cluster storage device.

At 820, method 800 can comprise updating a mapped cluster based on the substitution of the reserved real cluster storage device. In an aspect, failure of the real cluster storage device, which can be mitigated by substituting the reserved real cluster storage device, can correspond to a loss of a mapped storage device of the mapped cluster, wherein the mapped storage device corresponded to the now failed real cluster storage device. As such, updating the mapped cluster can result in substituting a new mapped storage device, e.g., corresponding to the substituted real cluster storage device, for the lost mapped storage device.

Method 800, at 830, can comprise determining, based on a first topology of the mapped cluster prior to the failure of the real cluster storage device, a second topology for the mapped cluster. In an aspect, the second topology can be determined based on preserving node diversity of the mapped cluster. Preserving node diversity of the mapped cluster can prohibit topologies wherein failure of a real node of a real cluster correlated to the mapped cluster can cause failure of more than one mapped node of the mapped cluster. As an example, the second topology can relate to updating mapped disk relationships such that the real data stored on a real cluster storage device corresponds to mapped data associated with a mapped disk that is associated with a different mapped node than the same data according to the first topology. Whereas the mapped cluster can comprise stored information indicating relationships between a logical location of data and a physical storage address (or other identifier) of the data, mapped clusters can generally be adapted more efficiently than physically moving, coping and deleting, duplicating, mirroring, etc., real data between real storage locations. As an example, mapped data can indicate a logical location of a user data that corresponds to a physical storage address of the user data, wherein the logical location can be indicate a mapped address of a mapped storage element of a mapped storage device of a mapped node of a mapped cluster, and wherein the user data is stored in a real storage element having an storage element address of a real storage device of a real node of a real cluster. As such, operations on the mapped data can be translated into operations on the real data via the relationship between the mapped data and the corresponding real data. Moreover, the mapped data can be stored and updated, for example, so that the relationships are non-volatile, to enable bundling of operations where several operations are indicated before being optimized and performed, etc. Additionally, the mapped data can be updated to indicate a change in a relationship to real data. The changes to the relationship can, for example, be an update to the logical location of the mapped data that corresponds to the real data, e.g., the real data can remain in a same real storage element address and the mapped data can be moved, copied, duplicated, or otherwise operated on, for example, moving the logical location of the mapped data between mapped nodes, between mapped clusters, between mapped disks, etc. As such, the second topology can typically be implemented with fewer data operations than would be associated with implementing a similar change in topology to a real cluster.

At 840, method 800 can comprise writing data to the substituted reserved real cluster storage device according to the second topology. At this point method 800 can end. In an aspect, updating the mapped cluster to comprise the new mapped storage device in place of the lost mapped storage device can enable the mapped cluster to use the new mapped storage device, for example, to rebuild the cluster after the loss of the mapped storage device. In this regard, use of the new mapped storage device can correspond to the mapped cluster writing data to the new mapped cluster, which data can be propagated to the substituted reserved real cluster storage device. In an embodiment, this can mitigate the effects of losing a real cluster storage device on a mapped cluster.

In an embodiment, the writing data to the substituted reserved real cluster storage device according to the second topology can update the topology of the mapped cluster from the first topology to the second topology. This can enable the mapped cluster to be node diverse while still employing the new mapped storage device corresponding to the substituted reserved real cluster storage device. Node diversity can provide additional data protection against subsequent potential failures of other real nodes of the real cluster by prohibiting the mapped cluster from having a topology, e.g., the second topology, that comprises representations of data from one real node being correlated to mapped data in more than one mapped node of the mapped cluster, which can facilitate loss of a subsequent real node from causing loss of more than one mapped node of the mapped cluster, which can be associated with data loss in mapped clusters designed to withstand single mapped node losses.

Figure 9:
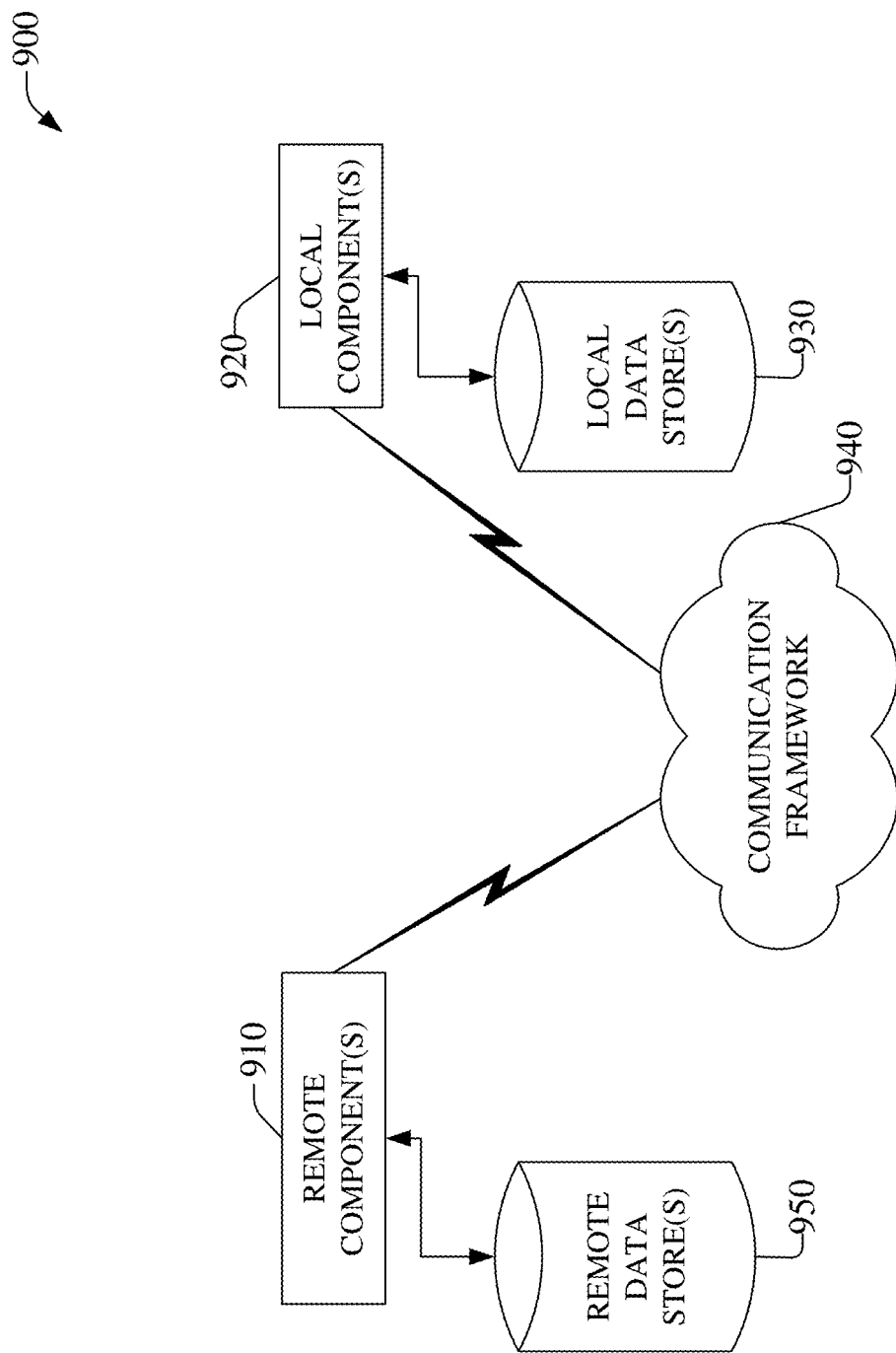
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be components of one or more physical storage component(s) 110, 210, 310, 410, 510, 610, etc., mapped cluster control component 102, 104, etc., for example, connected to an MSC, such as MSC 120, 130, 220, 230, 320, 330, 420, 430, 520, 620, 621, etc., via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise MSC 120, 130, 220, 230, 320, 330, 420, 430, 520, 620, 621, etc., mapped cluster control component 102, 104, etc., or other local components connected via communication framework 940 to remote components.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to a topology, a change in a topology, a data operation, a relation between a data representation and a correlated data, etc., can be communicated via communication framework 940 between local and remote components, e.g., to facilitate mitigation of effects from the loss of a real storage device on a corresponding mapped cluster, operations on data and data representations, etc., as disclosed herein.

Figure 10:
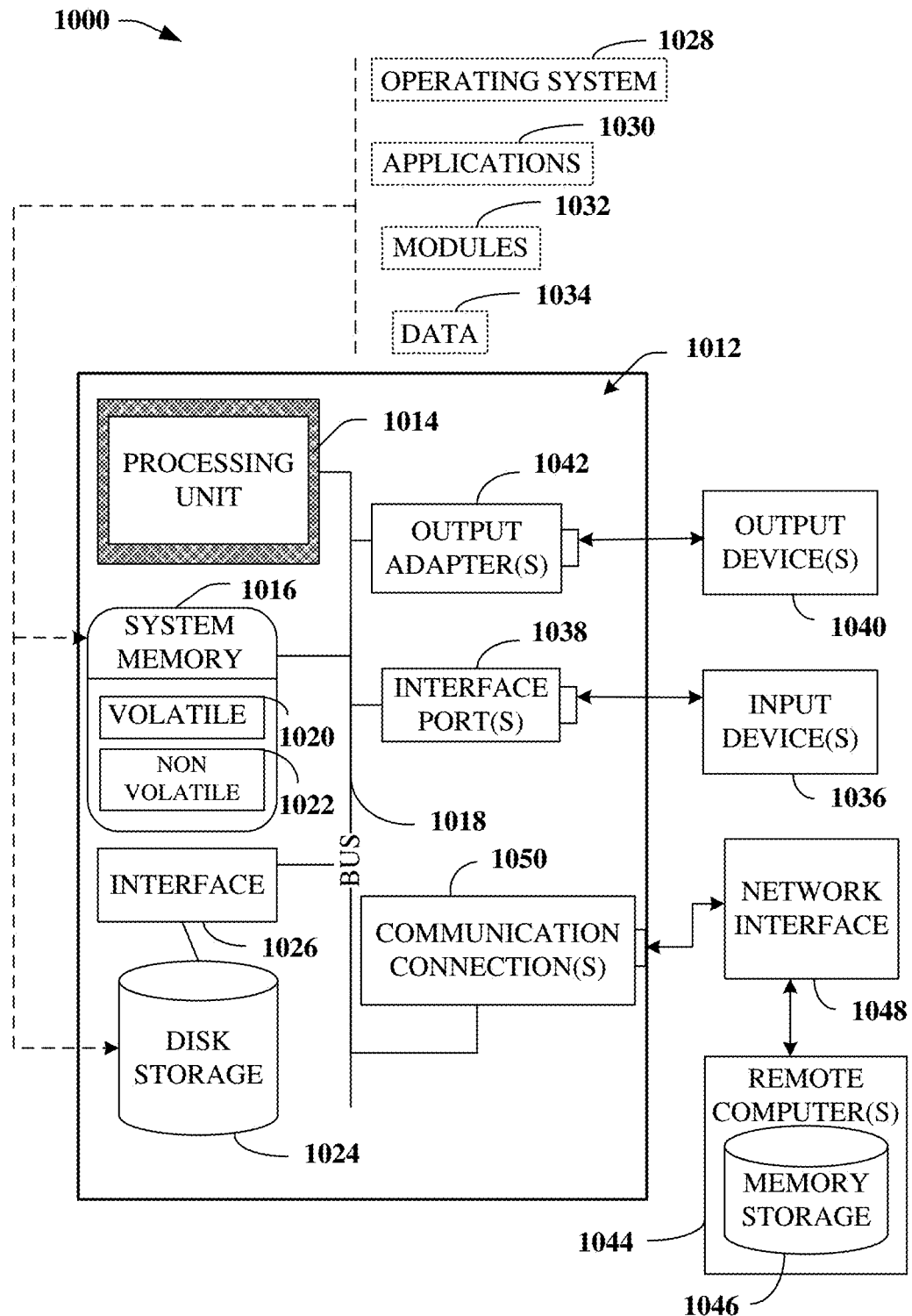
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in one or more physical storage component(s) 110, 210, 310, 410, 510, 610, etc., mapped cluster control component 102, 104, etc., MSC 120, 130, 220, 230, 320, 330, 420, 430, 520, 620, 621, etc., or other components, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor, e.g., MSc 120, 130, 220, 230, 320, 330, 420, 430, 520, 620, 621, etc., mapped cluster control component 102, 104, etc., PSC 110-610, etc., or processors of other devices germane to the disclosed subject matter, to perform operations, comprising determining an updated topology of a mapped cluster, e.g., MSC 120-620, etc., in response to receiving an indication that a real storage device of a real node of a real cluster, e.g., PSC 110-610, etc., has been replaced with a reserved real storage device in response to the real storage device becoming less accessible, as disclosed herein. This can enable use of the reserved real storage device in a manner that mitigates the effect on the mapped cluster due to the real storage device becoming less accessible.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving an indication that a real storage device of a real cluster has become less accessible than a previous accessibility, wherein the real cluster comprises a reserved real storage device;
based on the indication, substituting the reserved real storage device for the real storage device that has become less accessible, wherein the substituting results in updating a mapping of a mapped storage device corresponding to the real storage device based on the substituting the reserved real storage device, resulting in an updated mapped storage device of a mapped cluster of the real cluster; and
writing first data to the reserved real storage device corresponding to the first data being directed to be written to the updated mapped storage device.

2. The system of claim 1, wherein the real storage device of the real cluster has become less accessible because a real node of the real cluster has become less accessible, wherein the real node comprises the real storage device, and wherein the real node does not comprise the reserved real storage device.

3. The system of claim 1, wherein the real storage device of the real cluster has become less accessible as a result of a change in a network resource employed by the real cluster.

4. The system of claim 1, wherein the real storage device of the real cluster has become less accessible as a result of a change in a storage resource employed by the real cluster.

5. The system of claim 1, wherein the real storage device of the real cluster has become less accessible as a result of a change in a computer processing resource employed by the real cluster.

6. The system of claim 1, wherein the reserved real storage device is comprised in a reserved real node of the real cluster.

7. The system of claim 1, wherein the reserved real storage device is comprised in a real node of the real cluster, and wherein the real node is not a reserved real node of the real cluster.

8. The system of claim 1, wherein the writing the first data to the reserved real storage device corresponding to the first data being written to the updated mapped storage device results in real storage devices of a real node of the real cluster mapping to mapped storage devices of multiple mapped nodes of the mapped cluster.

9. The system of claim 1, wherein the writing the first data to the reserved real storage device corresponding to the first data being written to the updated mapped storage device results in real storage devices of a real node of the real cluster mapping to mapped storage devices comprised in a single mapped node of the mapped cluster.

10. A mapped cluster system, comprising:
a processor; and
a memory that stores executable instructions that, when executed by the processor, facilitate performance of operations, comprising:
receiving an indication that a mapping of a mapped storage device of a mapped node of a mapped cluster of the mapped cluster system has been updated, resulting in an updated mapped storage device, wherein the updated mapped storage device corresponds to a reserved real storage device that has been substituted for a real storage device of a real node of a real cluster, wherein the reserved real storage device has been substituted for the real storage device because the real storage device has become less accessible according to an accessibility criterion, and wherein the reserved real storage device is comprised in the real node of the real cluster; and
writing first data to the updated mapped storage device based on the indication, wherein the writing the first data results in writing the first data to the reserved real storage device.

11. The mapped cluster system of claim 10, wherein the writing the first data results in an updated relationship between the mapped cluster and the real cluster, and wherein the updated relationship does not result in node diversity for the mapped cluster.

12. The mapped cluster system of claim 10, wherein the writing the first data results in an updated relationship between the mapped cluster and the real cluster, and wherein the updated relationship maintains node diversity for the mapped cluster.

13. The mapped cluster system of claim 10, wherein the processor is a real processor supporting the mapped cluster.

14. The mapped cluster system of claim 13, wherein the mapped cluster is a first mapped cluster, wherein the processor is a first real processor supporting the first mapped cluster, and wherein the mapped cluster system further comprises a second processor supporting a second mapped cluster that is a different mapped cluster than the first mapped cluster.

15. The mapped cluster system of claim 14, wherein the second processor is a second real processor.

16. The mapped cluster system of claim 14, wherein the second processor is an instance of a virtual processor executed on a real processor.

17. The mapped cluster system of claim 10, wherein the processor is a first instance of a first virtual processor, wherein the first instance of the first virtual processor supports the mapped cluster, and wherein the first instance is executed on a real processor.

18. The mapped cluster system of claim 17, wherein the mapped cluster is a first mapped cluster, wherein the real processor further executes a second instance of a second virtual processor, wherein the second instance supports a second mapped cluster, and wherein the second mapped cluster is a different mapped cluster than the first mapped cluster.

19. A non-transitory machine-readable medium, comprising executable instructions that, when executed by a processor, facilitate performance of operations, comprising:
in response to receiving an indication that a real storage device of a real node of a real cluster has been replaced with a reserved real storage device as a result of the real storage device having become less accessible, updating a topology of a mapped cluster to reflect a loss of a mapped storage device corresponding to the real storage device and an addition of a substitute mapped storage device corresponding to the reserved real storage device, wherein the updating results in an updated topology of the mapped cluster; and
writing first data to the substitute mapped storage device based on the updated topology, wherein the writing the first data to the substitute mapped storage device causes writing of the first data to the reserved real storage device.

20. The non-transitory machine-readable medium of claim 19, wherein the updated topology preserves node diversity of the mapped cluster via preventing real storage devices of any one real node of the real cluster from corresponding to mapped storage devices of any group of mapped nodes of the mapped cluster.

* * * * *